(12) United States Patent
Couper

(10) Patent No.: US 10,068,189 B2
(45) Date of Patent: Sep. 4, 2018

(54) STORING AND DEPICTING ORGANIZATIONS THAT ARE SUBJECT TO DYNAMIC EVENT DRIVEN RESTRUCTURING

(75) Inventor: Christopher C. Couper, Shingle Springs, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 2991 days.

(21) Appl. No.: 11/757,254

(22) Filed: Jun. 1, 2007

(65) Prior Publication Data
US 2008/0300952 A1    Dec. 4, 2008

(51) Int. Cl.
*G06Q 10/06* (2012.01)

(52) U.S. Cl.
CPC ....... *G06Q 10/06* (2013.01); *G06Q 10/06311* (2013.01)

(58) Field of Classification Search
CPC ... G06Q 10/00; G06Q 10/06; G06Q 10/06311
USPC ....................................... 705/7.13
See application file for complete search history.

(56) References Cited

U.S. PATENT DOCUMENTS

| | | | | |
|---|---|---|---|---|
| 5,467,440 | A | * | 11/1995 | Nihei ............................ 345/440 |
| 5,829,003 | A | * | 10/1998 | Okura | |
| 6,691,120 | B1 | * | 2/2004 | Durrant ............. G06F 17/30539 |
| 7,091,852 | B2 | | 8/2006 | Mason et al. | |
| 7,437,320 | B2 | * | 10/2008 | Davidson ............... G06Q 10/06 |
| | | | | 705/7.11 |
| 7,734,662 | B2 | * | 6/2010 | Rowley ............. G06F 17/30961 |
| | | | | 707/803 |

(Continued)

FOREIGN PATENT DOCUMENTS

WO    WO 2007108542 A1  *  9/2007

OTHER PUBLICATIONS

"Incident Command System", U.S. Department of Labor, Occupational Safety & Health Administration, www.osha.gov; http://replay.waybackmachine.org/20060412171501/http://www.osha.gov/SLTC/etools/ics/org_ops.htttml; 2005-2006.*

(Continued)

*Primary Examiner* — Pan G Choy
(74) *Attorney, Agent, or Firm* — Cuenot, Forsythe & Kim, LLC

(57) ABSTRACT

The present invention discloses a solution for storing and depicting complex non-contiguous organizations that are subject to situation-based restructuring. Different views for organization charts of the organization can be generated, where the generated organization charts are collapsed to a minimal view which automatically hides at least a portion of the organization positions in accordance with a desired view. For example, a view showing only filled positions will hide unfilled positions, collapsing intermediate nodes of a shown hierarchy so that child nodes of a hidden node are directly connected to the parent node of the hidden node. A set of indexed database tables can be used to efficiently store details of the organization. The indexed tables can store positions, assignment, and position reporting details in separate 3NF tables. The solution can be integrated to a commercial off-the-shelf command management system and/or to a commercial off-the-shelf front-end charting application.

20 Claims, 5 Drawing Sheets

(56) References Cited

U.S. PATENT DOCUMENTS

| | | | |
|---|---|---|---|
| 7,747,457 B2* | 6/2010 | Cullen et al. | 705/7.13 |
| 7,814,427 B2* | 10/2010 | Cook et al. | 715/763 |
| 2002/0129033 A1 | 9/2002 | Hoxie et al. | |
| 2003/0023476 A1 | 1/2003 | Gainey | |
| 2004/0102924 A1* | 5/2004 | Jarrell | G06Q 10/04 702/181 |
| 2004/0111431 A1* | 6/2004 | Zeller | G06F 17/30994 |
| 2004/0210827 A1* | 10/2004 | Burg et al. | 715/501.1 |
| 2005/0075917 A1* | 4/2005 | Flores | G06Q 10/06 705/7.11 |
| 2005/0086530 A1* | 4/2005 | Goddard | 713/201 |
| 2005/0165616 A1 | 7/2005 | Ellis et al. | |
| 2005/0251405 A1 | 11/2005 | Kreiner et al. | |
| 2006/0211404 A1* | 9/2006 | Cromp | G06Q 10/06 455/405 |
| 2006/0224629 A1 | 10/2006 | Alexander et al. | |
| 2007/0033095 A1 | 2/2007 | Hodgin | |
| 2007/0050239 A1 | 3/2007 | Caneva | |
| 2007/0061191 A1* | 3/2007 | Mehrotra et al. | 705/11 |
| 2007/0083409 A1 | 4/2007 | Dilbeck et al. | |
| 2007/0094607 A1* | 4/2007 | Morgan et al. | 715/762 |
| 2007/0143336 A1* | 6/2007 | Lindley | G06Q 10/10 |
| 2008/0040135 A1* | 2/2008 | Vanlangen et al. | 705/1 |
| 2008/0091441 A1* | 4/2008 | Flammer | G06Q 10/06 705/320 |

OTHER PUBLICATIONS

"Make Visio 2002 Organization Charts from Personnel Files", (hereinafter: Visio 2002), Microsoft Corporation, 2002. http://web.archive.org/web /20020203003415/http://office.microsof.com/assistance/2002/articles/spotlight5_july00.aspx.*

"Create Flexible Organization Charts with Visio 2002", Microsoft, 2002; http://web.archive.org/web/20011126023844/http://office.microsof.com/assistance/2002/articles/spotlight4_july00.aspx.*

"Using WordPerfect Office X3", by Laura Acklen and Read Gilgen, Que Publishing, 2006; p. 841-848.*

"OrgPlus Standard", by HumanConcepts, 3 Harbor Drive, Suite 200, Sausalito, CA 94965 USA; Jun. 2006.*

"Make Visio 2002 Organization Charts from Personnel Files", (hereinafter: Visio 2002), Microsoft Corporation, 2002.*

"Create Flexible Organization Charts with Visio 2002", Microsoft, 2002.*

"Using WordPerfect Office X3", by Laura Acklen and Read Gilgen, Que, 2006; p. 841-848.*

"OrgPlus Standard", by HumanConcepts, Jun. 2006.*

"The Flattening Firm: Evidence from Panel Data on the Changing Nature of Corporate Hierarchies", by Raghuram G. Rajan, GSB, University of Chicago, and Julie Wulf, Wharton School, University of Pennsylvania, Sep. 2003.*

"An Effective Role Administration Model Using Organization Structure", by Sejong Oh et al., ACM Transactions on Information and System Security, vol. 9, No. 2, May 2006, pp. 113-137.*

"Empower-HR OrgCharter V2", MIS OrgCharter, User and Configuration Guide V2, Aug. 3, 2006.*

"Formatting Your Organizational Charts", by Anonymous, Inside Microsoft PowerPoint; Aug. 2000; 7, 8; ProQuest Central, p. 5.*

"Easily Create Organizational Charts in PowerPoint: Part 2", by Nathan Adamus, Inside Microsoft PowerPoint; Nov. 2002; 9, 11; ProQuest Central, p. 6.*

"Make Visio 2002 Organization Charts from Personnel Files", Microsoft Corporation, 2002.*

"Evidence from Panel Data on the Changing Nature of Corporate Hierarchies", by Raghuram G. Rajan, GSB, University of Chicago, and Julie Wulf, Wharton School, University of Pennsylvania, Sep. 2003.*

"Microsoft Opens Up Visual Schemas", Ed Scannell, InfoWorld; Apr. 19, 2004; 26, 16; ProQuest Central, p. 20.*

"A Key to Organizational Effectiveness at Federal Express Corporation", Prashant C. Palvia et al., MIS Quarterly; Sep. 1992; 16, 3; ProQuest Central, p. 277.*

"Incident Command System for Emergency Medical Services, 1st Edition", FEMA, U.S. Fire Administration, National Fire Academy, Jan. 1999.*

"National Incident Management System", U.S. Depantment of Homeland Security, Mar. 1, 2004.*

"Incident Command System", U.S. Department of Agriculture, Jun. 2003.

* cited by examiner

STORING AND DEPICTING ORGANIZATIONS THAT ARE SUBJECT TO DYNAMIC EVENT DRIVEN RESTRUCTURING

BACKGROUND

Field of the Invention

The present invention relates to a software tool for organization structures and, more particularly, to storing and depicting organizations that are subject to dynamic event driven restructuring.

Description of the Related Art

Organization charts are used to graphically represent an organization structure, which can include organization positions, position titles, names of individuals occupying a position, a reporting structure, and the like. Some organizations are relatively stagnant, which results in a relatively stable organization structure that is periodically updated to reflect any changes to position organization and staffing which may have occurred. Other organizations, such as a matrixed organization, include multiple different hierarchy structures, each requiring different organization charts. For instance, a matrixed structure can have functional reporting structures that are project specific and can also have an organization structure showing a supervisory chain. In a matrixed organization, a functional leader requiring resources can contact a supervisor in charge of the resources and can negotiate a temporary resource allocation for a related project.

An even more complex organization structure exists for non-contiguous organizations. Non-contiguous organizations are often used to manage major responses to a situation; these responses can be complex and multi-jurisdictional. For instance, a hurricane or flood response can include local, state, and federal responders as well as numerous civilian volunteers and organizations. In another instance, international military campaigns can include personnel from different service branches of a common country, which coordinate with other response units of different countries. Reporting structures for non-contiguous organizations are constantly evolving as new groups are added and removed and as situational factors change, which requires organizational modifications.

A number of computing systems, such as the Incident Command System (ICS), have been created to help manage major responses involving non-contiguous organizations. At present, command managements systems such as ICS do not possess an ability to seamlessly and automatically generate current organization structures and charts. This lack is due to a present lack of sophistication of organization chart management and rendering software. Command systems generally rely on organization structures linked to a set of organizational templates, each template being associated with a situation.

These template generated structures typically require some situational modifications which are not automated. Thus, organization leaders must constantly add and delete positions and position manning and re-arrange organization charts, which are costly in terms of time, delay, and inevitable inadvertent mistakes. Further, manual selection and modification of organization structures requires a deep understanding of appropriate organization structure details and current situational factors that affect the structure. Further complications, such as jurisdictional in-fighting, communication short-tails, conflicting reporting of situational factors, confusion resulting from responders relying upon out-of-date organization reporting structures, and the like, result in response inefficiencies which can result in loss of property or life.

What is needed is an organization structure tool that is integrated with a command system. This organization structure tool should be capable of automatically adjusting reporting structures, positions, and manning as situational factors of the command system change. Responders should be able to use the organization structure tool to generate current organization charts in paper or electronic form which should minimize confusion caused by a dynamic reporting structure. No known organization structure tool exists that has these desired capabilities.

SUMMARY OF THE INVENTION

The present invention discloses a solution for storing and depicting organizations that are subject to dynamic event driven restructuring. Organization charts for an organization structure can be generated for different user specified views, some of which hide one or more organization positions. The organization charts can be automatically collapsed to show a minimal view in consideration of the hidden positions. In one arrangement, the disclosed solution can be linked to a Web server which is able to deliver current and dynamically created organization structures to remotely located browsers. Generated charts of an organization structure can also be printed to be carried by deployed responders and/or to be posted at locations accessible by responders of an organization. Further, the solution can be integrated to commercial off-the-shelf or customized back-end command systems and front-end charting applications.

In one configuration, an integrated back-end system can be an Incident Command System (ICS), where the solution is able to dynamically adjust content and structure of the database tables as command system managed information changes. The solution is not limited to ICS integration and integration with other command and/or incident management systems, such as GROOVE NETWORKS, E-TEAM, BLUE 292, WEBEOC, and the like are contemplated.

The organization structure can be efficiently stored and managed in indexed tables in which organizational positions are independent of their current reporting structure and assigned personnel. Dated historical structures can also be stored along with their respective manning for record maintenance and archiving purposes. The indexed tables can support structured organizational positions as well as tactical/independent positions that are not part of a hierarchically organized structure. Further, the indexed tables can support multiple nodes at a top level reporting structure, can manage command staff support positions independent of other positions, and can include optional information hiding capabilities for protecting confidential information from unauthorized users. Additionally, template features can facilitate an automated generation/restructuring of positions based upon incident occurrences and a detection of previously established situational events which may be handled by a command system linked to the organizational tool that manages the indexed tables.

The present invention can be implemented in accordance with numerous aspects consistent with the material presented herein. For example, one aspect of the present invention can include a solution for storing and depicting complex non-contiguous organizations that are subject to situation-based restructuring. Different views for organization charts of the organization can be generated where the generated organization charts are automatically collapsed to a minimal view which automatically hides at least a portion of the organization positions in accordance with a desired view. For example, a view showing only filled positions will hide unfilled positions, collapsing intermediate nodes of a shown hierarchy so that child nodes of a hidden node are directly connected to the parent node of the hidden node. A set of indexed database tables can be used to efficiently store details of the organization. The indexed tables can store positions, assignment, and position reporting details in separate third normal form (3NF) tables. The solution can be integrated to a commercial off-the-shelf command management system and/or to a commercial off-the-shelf front-end charting application.

Another aspect of the present invention can include a method for charting an organization. In the method, a set of database tables for an organization structure can be identified. The tables can include a position table, a position reporting table, a resource table, and an assignment table. The position table can contain a unique record for each position within an organization structure. The position reporting table can contain a unique record for each relationship among the positions of table. The resource table can contain a unique record for each resource capable of occupying a position. The assignment table can contain a unique record for each resource/position assignment. A user request for an organization chart can be received. The set of database tables can be queried to generate an organization object. The organization object can be converted into a graphical organization table, which is presented to a requestor.

Still another aspect of the present invention can include an organizational management computing system that includes incident management software and a charting tool. The incident management software can include programmatic instructions for centrally managing incidents involving at least one organization having an organization structure that dynamically varies as situation factors of a managed incident changes. The incident changes can be recorded by the incident management system, which causes the incident management system to effect corresponding changes in the organization structure. The charting tool can dynamically generate organization charts depicting the organization structure at a user specifiable point in time based upon a set of indexed relational database tables containing records that together define the organization structure. The relational database tables can be arranged so that records unique to organizational positions are independent of a reporting relationship among positions. The relational database tables can further be arranged so that records unique to the organizational positions are independent of personnel assigned to the positions.

It should be noted that various aspects of the invention can be implemented as a program for controlling computing equipment to implement the functions described herein, or as a program for enabling computing equipment to perform processes corresponding to the steps disclosed herein. This program may be provided by storing the program in a magnetic disk, an optical disk, a semiconductor memory, or any other recording medium. The program can also be provided as a digitally encoded signal conveyed via a carrier wave. The described program can be a single program or can be implemented as multiple subprograms, each of which interact within a single computing device or interact in a distributed fashion across a network space.

It should also be noted that the methods detailed herein can also be methods performed at least in part by a service agent and/or a machine manipulated by a service agent in response to a service request.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
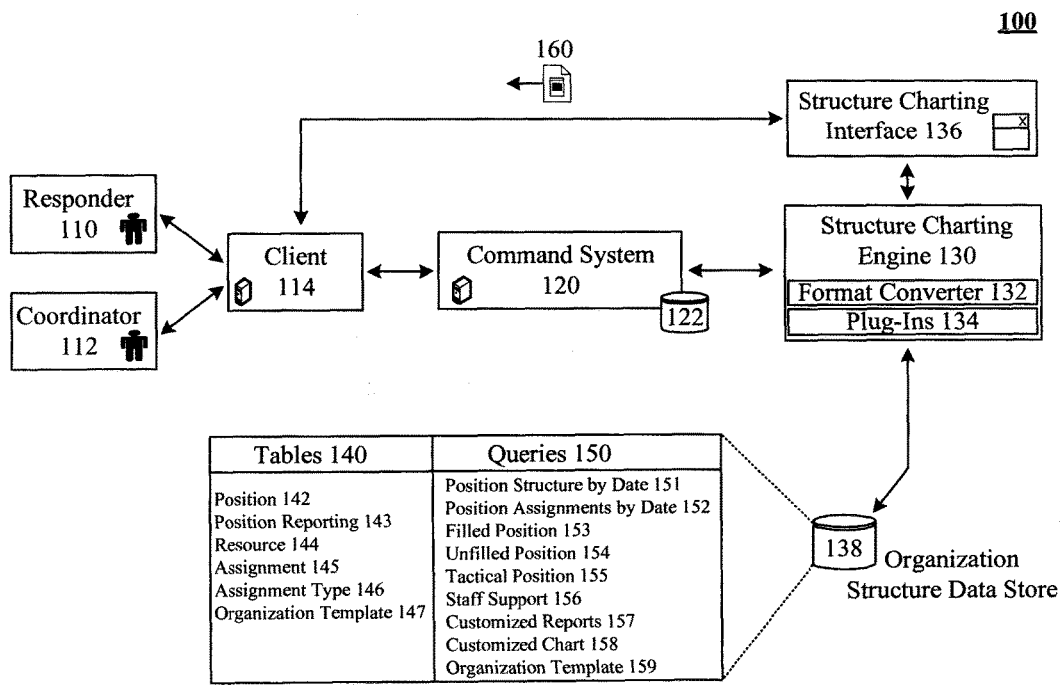
FIG. 1 is a schematic diagram of a system in which non-contiguous organizations can be modeled in software capable of generating organization charts in accordance with an embodiment of the inventive arrangements disclosed herein.

FIG. 1 is a schematic diagram of a system 100 in which non-contiguous organizations can be modeled in software capable of generating organization charts 160 in accordance with an embodiment of the inventive arrangements disclosed herein. The organization charts 160 can be customized for a particular responder 110 or group of responders 110 to indicate a relationship within an organization structure, which includes indicating a reporting structure for each responder 110. The organization charts 160 can be automatically updated as a depicted organization structures change. In one embodiment, situational information can be managed by a command system 120 which initiates data driven events that change the organization structure specified in data store 138. The structural information of data store 138 can be used by a structure charting engine 130 which generates the charts 160 based upon the data store 138 information.

The charts 160 can be presented to numerous client 114 systems via a client-facing interface 136 which can be accessed by responders 110 and coordinators 112. Each client 114 can graphically display the organization charts 160, such as through a Web browser, and/or can print paper copies of the charts 160. Further, clients 114 can input criteria relevant to a specific user which results in customized charts 160 suitable for the user criteria. Different views for organization charts 160 can be generated where the generated organization charts 160 are collapsed to a minimal view which automatically hides at least a portion of the organization positions in accordance with a desired view. For example, a view showing only filled positions will hide unfilled positions, collapsing intermediate nodes of a shown hierarchy so that child nodes of a hidden node are directly connected to the parent node of the hidden node.

The organization structure depicted by the organization chart 160 can be of varying complexity from a relatively basic structure to a complex multi-jurisdictional one. The organization structure can also be an adaptive and dynamic structure that changes as situational factors change. For example, the organization structure can be a hurricane relief organization comprising unaffiliated volunteers, privately organized response units as well as local, state, and federal relief personnel all working together in a loosely coupled group whose membership and focus shifts dynamically as situational factors change.

The organization structure of data store 138 can be specified by records of a set of indexed inter-related tables 140. In one arrangement, the tables 140 can include a position table 142, a position reporting table 143, a resource table 144, an assignment table 145, an assignment type table 146, an organization template table 147, and the like.

The position table 142 can contain a row for each position within an organization structure. The position reporting table 143 can contain a row for each relationship among the positions of table 142. The position reporting table 143 can indicate which positions other positions currently and/or historically report to. The resource table 144 can include records for individuals, group, and/or teams that are able to fill one or more of the positions of table 142. Each person and/or non-divisible group can be associated with one record in the resource table 144. The assignment table 145 can specify relationships and relationship details between positions and resources. Each assignment of a person to a position can be associated with a table 145 record. Different types of assignments of table 145 can share a set of common attributes, which can be specified in the assignment type table 146. The organization template table 147 can contain templates that can be used to rapidly create an organization structure at a start of an incident and/or to modify an organization structure based upon situational factors of an incident.

A set of queries 150 can be created and used by the structure charting engine 130, which produce results based upon information of tables 140. In one arrangement, the queries 150 can be Structured Query Language (SQL) based queries. An optional SQL interface (not shown) or other report/query construction interface can also be used to dynamically specify queries 150 in system 100. As shown, the queries 150 can include a position structure by date 151 query, a position assignments by date 152 query, a filled position 153 query, an unfilled position 154 query, a tactical position 155 query, a staff support 156 query, a customized set of reports 157 query, a customized set of charts 158 query, and a set of queries 159 related to me organization templates 147.

A position by date 151 query can construct an organization chart template or report that shows active positions on a user specified date. The organization chart template/report can be used to generate a graphic organization chart 160 presentable via interface 136. The position assignments query 152 can generate an organization chart for a specified date which shows personnel/teams assigned to the various positions. The filled position query 153 can generate a collapsed organization chart showing only those positions that are staffed. The unfilled position query 154 can generate an organization chart showing those positions that are currently unfilled. Optionally, query 154 can also generate a list of available resources having suitable skills that are able to fill these unfilled positions. The tactical position query 155 can generate one or more organization charts for tactical positions and/or tactical units. Use of query 155 may require a user to provide suitable authentication codes since tactical positions (and other sensitive positions) are able to be hidden from unauthorized personnel. The staff support query 156 can generate an organization chart showing support staff dedicated to a top level of command. The customized reports 157 and queries 158 can include reports and queries specifically generated for/by an organization. The template queries 159 can be used to help initially generate tables 140 and/or to modify tables 140 based upon situational factors managed by system 120.

The tables 140 and queries 150 are provided for descriptive purposes only and are not intended to constrain the disclosed invention to a fixed configuration. That is, any repository of digitally stored information capable of accomplishing approximately the same results as achieved by tables 140 and/or queries 150 regardless of organization structure and implementation methodology are to be considered within the scope of system 100.

As shown in system 100, the command system 120 can be a computing system designed to manage non-contiguous organizations. The organization managed by the command system 120 can dynamically restructure itself based upon situational factors. Often the command system 120 will be an incident management system 120 designed to manage a disaster (hurricane, flood, fire) response, a military campaign, an organization specifically created for a non-standard, large-scale effort, and the like. The command system can, for example, be an Incident Command System (ICS).

The structure charting interface 136 can be any user interface for presenting or creating the organization chart 160. The interface 136 can be integrated with the engine 130 and/or the command system 120 or can be stand-alone program. For example, the interface 136 can be part of a program, such as ORGPLUS or the organization charting tools integrated into many popular office suite programs. In one embodiment, the interface 136 can be a graphical and/or voice based interface configured to conveniently present organization chart 160 to deployed responders 110. For instance, the interface 136 can be a markup based interface which can be rendered by a standard Web browser. The interface 136 can also be part of a voice response system accessible via a telephone (client 114).

The structure charting engine 130 can be capable of generating software objects which the interface 136 is able to convert into organization chart 160. The engine 130 can be integrated with the command system 120 and can utilize the tables 140 and/or queries 150 of data store 138. The charting engine 130 can optionally include a format converter 132 and/or a set of expandable plug-ins 134.

The format converter 132 can perform data transformations for communicating with different command systems 120. Further, the format converter 132 can include data migration and synchronization components which enable separately maintained information to be converted into the structure of tables 140. The plug-ins 134 can permit the construction of organization chart objects that are compatible with specific interfaces 136. For example, a specific plug-in 134 can enable the engine 134 to be compatible with an ORGPLUS front-end application.

The various components of system 100 can be communicatively linked via a network (not shown). The network can include any hardware/software/and firmware necessary to convey digital content encoded within carrier waves. Content can be contained within analog or digital signals and conveyed through data or voice channels and can be conveyed over a personal area network (PAN) or a wide area network (WAN). The network can include local components and data pathways necessary for communications to be exchanged among computing device components and between integrated device components and peripheral devices. The network can also include network equipment, such as routers, data lines, hubs, and intermediary servers which together form a packet-based network, such as the Internet or an intranet. The network can further include circuit-based communication components and mobile communication components, such as telephony switches, modems, cellular communication towers, and the like. The network can include line based and/or wireless communication pathways.

Data stores 122 and 138 can be physically implemented within any type of hardware including, but not limited to, a magnetic disk, an optical disk, a semiconductor memory, a digitally encoded plastic memory, a holographic memory, or any other recording medium. Each of the data stores 122 and 138 can be a stand-alone storage unit as well as a storage unit formed from a plurality of physical devices, which may be remotely located from one another. Additionally, information can be stored within each data store in a variety of manners. For example, information can be stored within a database structure or can be stored within one or more files of a file storage system, where each file may or may not be indexed for information searching purposes.

Figure 2:
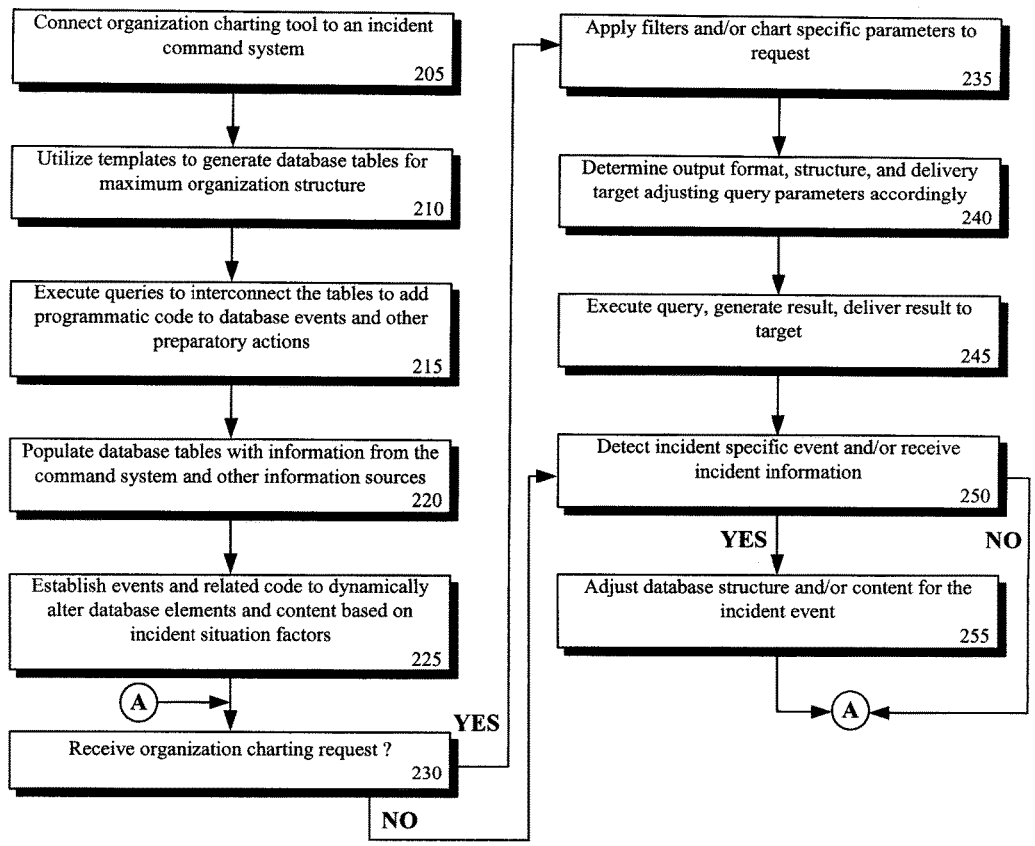
FIG. 2 is a flow chart of a method for interactions between an organization charting tool and an incident command system in accordance with an embodiment of the inventive arrangements disclosed herein.

FIG. 2 is a flow chart of a method 200 for interactions between an organization charting tool and an incident command system in accordance with an embodiment of the inventive arrangements disclosed herein. The method 200 can be performed in the context of system 100 or any similar system.

Method 200 can begin in step 205, where an organization charting tool can be programmatically connected to an incident command system. In step 210, a set of templates can be used to generate database tables for a maximum default organization structure. That is, all positions for the organization structure can have an entry in a position table regardless of whether each position is to be initially enabled. In step 215, a series of queries can be executed to interconnect the tables to each other (i.e., assuming referential integrity is enforced) and to add programmatic code to database events. Other preparatory actions can also be performed at this step, such as linking an organization charting engine to a front-end interface.

In step 220, the database tables of the organization structure can be populated with information from the command system, other information sources, and through manual information entry. Data migration tools can be utilized to reconcile differences in underlying data structures as necessary. In step 225, code and triggers can be established which can be used to dynamically alter the database structure so that it corresponds to a correct organization structure for incident specific factors. For example, when a new position is created in an organization to handle an incident situation, a new record can be created in a position table and other tables can be adjusted to reflect changes the new position effects in a reporting structure. After the proper triggers, event linked procedures, and the like have been established, the integrated system including the database tables can be utilized in a productive environment.

In step 230, an organization charting request can be optionally received from a front-end interface. When such a request is received, the method can proceed from step 230 to step 235, where filters and/or chart specific parameters can be applied. Some of these parameters can be based upon user selected options and other input. In step 240, a format, structure, and delivery target can be determined. The target can be a report, a Web browser interface, and/or a compatible front-end charting application, such as ORGPLUS. Parameters can be adjusted as appropriate for the delivery target, structure, and format. A generated organization chart can show a minimal possible view when one or more positions of an organization structure are not shown in the generated organization chart. That is, the generated organization chart can be automatically collapsed without any reorganization or manual manipulation of a generated chart being required. In step 245, one or more queries can execute for the organization charting request, one or more programmatic actions can execute for creating/processing the chart, and results can be delivered to a target client.

In step 250, an incident specific event can be detected. Incident specific information can be received/associated with the detected event. In step 255, a database structure used by the organization tool and/or content of the database can be adjusted based upon the incident specific event. A set of programs linked to the detected event can effectuate the content/structure changes to the database. The method 200 can iteratively repeated (looping from step 255 to step 230) so that new charting requests are continuously handled and so that database content and structure is dynamically altered as new incident specific events occur.

Figure 3:
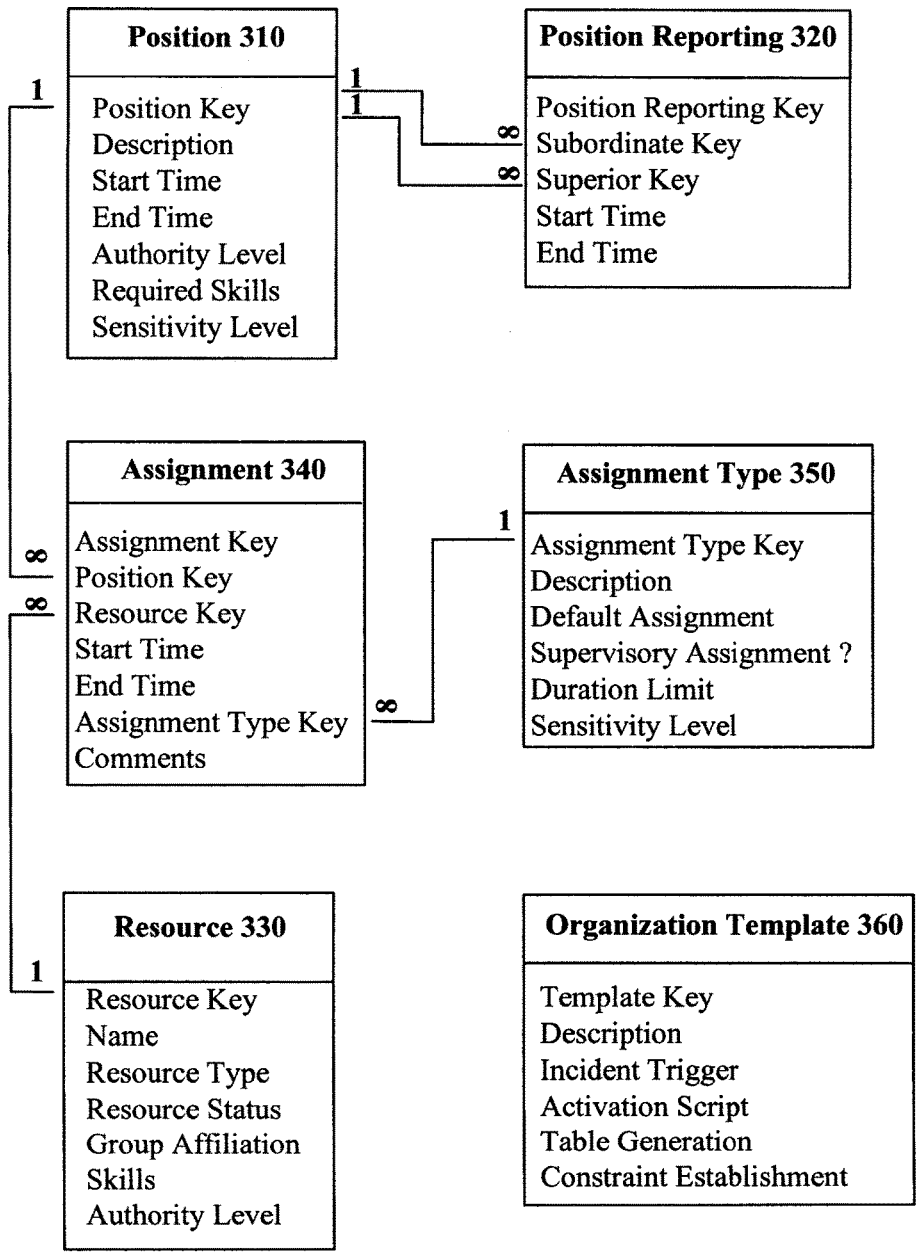
FIG. 3 is a diagram of a set of related database tables in accordance with an embodiment of the inventive arrangements disclosed herein.

FIG. 3 is a diagram 300 of a set of related database tables 310-360 in accordance with an embodiment of the inventive arrangements disclosed herein. Diagram 300 represents one arrangement and composition for the tables 140 of system 100. The tables 310-360 of diagram 300 are relational database tables expressed in third normal form (3NF). Although it is common to reduce tables to 3NF, performance considerations occasionally require optimizations to be made which can result in the tables 310-360 being structured in 2NF or otherwise configured. Further, as shown, referential integrity between related tables 310-360 is enforced, which is an optional setting.

As shown, a many-to-many relationship can exist between the position table 310 and the resource table 330. The assignment table 340 can be an associative table, which links records of tables 310 and 330 to each other. The position reporting table 320 can specify reporting relationships between positions of table 310. An assignment type 350 table can be linked to the assignment table 340 to provide details related to categories or types of assignments. An organization template table 360 can be used to generate a structure of the tables 310-350. Details expressed in tables 310-360 are for illustrative purposely only and can be modified to suit implementation requirements.

In diagram 300, position table 310 can include a position key (primary key), a description field, a start time, an end time, an authority level, a required skills field, a sensitivity level field, and the like. The start and end time can be used to indicate whether a position is currently enabled. These fields can also facilitate historical data concerning disabled positions. Tables 320 and 340 can also include start and end times for similar purposes. An authority level can represent a rank or pay grade associated with the position. The skills attribute can specify skills required/desired for the related position. The sensitivity level can be used to indicate whether a position is to be hidden or kept confidential. For example, a special operation position can be hidden from non-authorized users of table 310. Other tables 320-350, such as table 350, can also include a sensitivity level to restrict knowledge relating to specific records.

The position reporting table 320 can include a position reporting key (primary key), a subordinate key (foreign key), a superior key (foreign key), a start time, an end time, and the like. Subordinate and superior keys can indicate a chain of authority or command among the positions of table 310. A single position can report to more than one other position, such as a position having an administrative superior and one or more functional superiors.

The assignment table 340 can include an assignment key (primary key), a position key (foreign key), a resource key (foreign key), a start time, an end time, an assignment type key (foreign key), a comments field, and the like. Each time a person or team is assigned to a position or set of positions, new records can be added to the assignment table 340.

The assignment type table 350 can include an assignment type key (primary key), a description, a default assignment a supervisory indictor, a duration limit, a sensitivity level, and the like. The default assignment field indicates an authority relationship typical of the related assignment which can be overridden as circumstances dictate. The supervisory indictor can indicate whether an assignment type is for a team leader, a division leader, and the like. The duration limit can be used to specify whether an assignment is to terminate or change at a specified time which is the case for many elected or rotating assignments having an associated term limit.

The resource table 330 can include a resource key (primary key) a name, a resource type, a resource status, a group affiliation, resource skills, an authority level, and the like. The name can be used to specify a name for a person or team, depending upon a scope of the related record. The resource type 330 can indicate whether the resource is a group, an individual, or other type. The resource status can indicate whether the resource is on scene, in-route, on vacation, and other status indicators.

The organization template 360 can include a template key (primary key), a description, an incident trigger, an activation script, a table generation attribute, a constraint establishment attribute, and the like. The incident trigger can indicate a situation factor that causes a related trigger to execute. The activation script can be related to a specific executable. The table generation attribute can include a value that changes a table 310-350 structure appropriately for the triggered incident. The constraint establishment attribute can include referential integrity values or links to other code that imposes a constraint on a table, table record, or table attribute.

Figure 4:
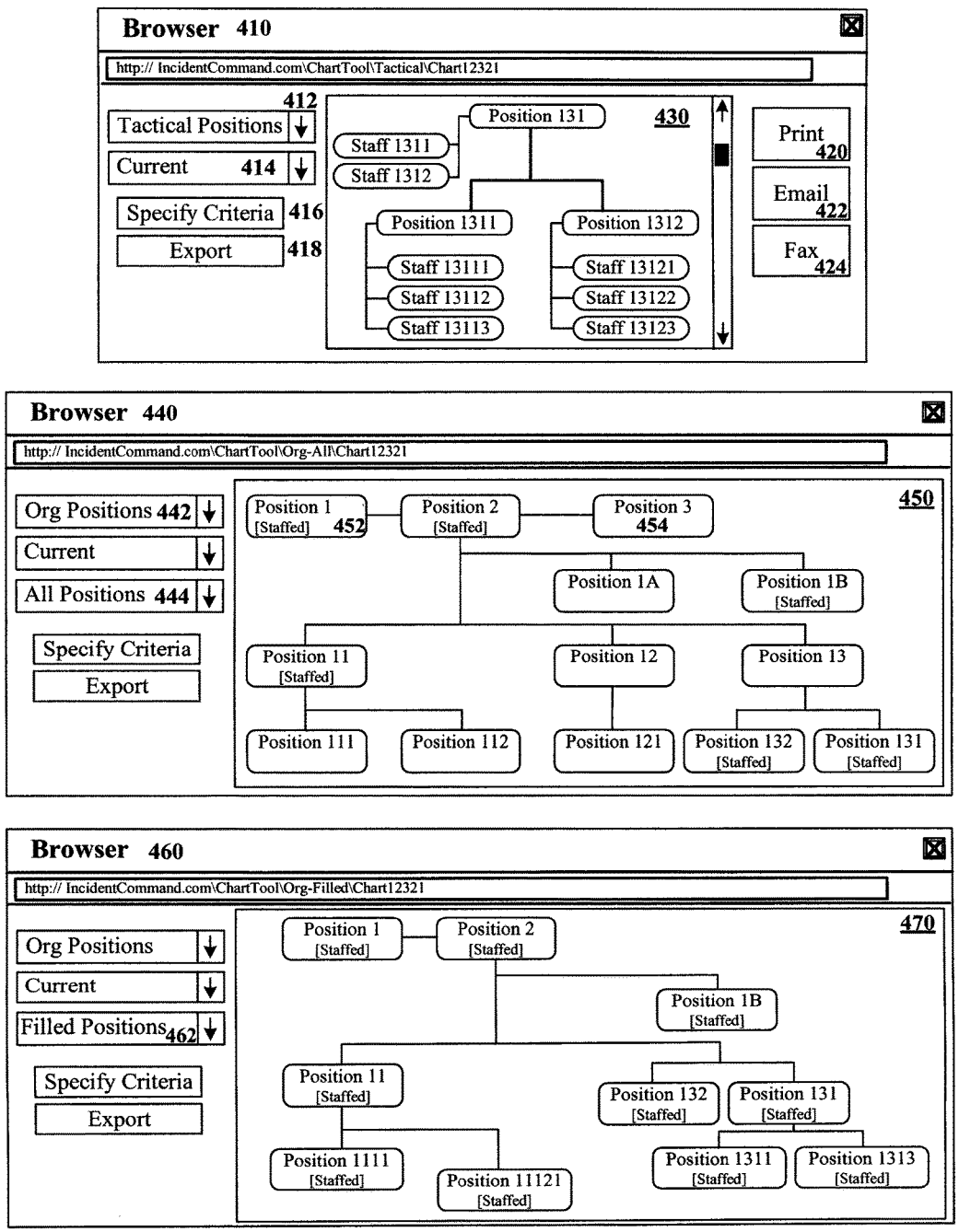
FIG. 4 illustrates a set of interfaces for creating and presenting organization charts in accordance with an embodiment of the inventive arrangements disclosed herein.

FIG. 4 illustrates a set of interfaces for creating and presenting organization charts in accordance with an embodiment of the inventive arrangements disclosed herein. The set of interfaces can be based upon the tables of diagram 300 or can be performed by components shown in system 100.

The interfaces are shown as browser 410, 440, 460 interfaces, but can be rendered in any software application whether Web-based or not. In another embodiment, the illustrated organization charts 430, 350, and/or 470 can be presented upon a printed document instead of a software application. Each of the interfaces can have user selectable options which alter details of a generated organization chart. It should be appreciated that the details shown in the interfaces are for illustrative purposes only, and different implementations of the invention can be opted to use interface elements other than those shown.

The interface in browser 410 shows a tactical organization chart 430. This chart 430 has three positions (position 131, 1311, and 1312), each associated with multiple staff positions (staff 1311, 1312, 13111, 13112, 13113, 13121, 13122, and 13123). The chart 430 is generated based upon a user selection in a chart type 412 control. A different control 414 can be used to specify a time (based upon a current time, a specified date, a specified time-stamped organization version, and the like) depicted by the chart 430. Additional criteria 416 for the chart 430 can also be specified. A user can further export 418 the chart 430 into a selectable format, such as a POWERPOINT format or one of another application capable of charting. Additionally, the chart 430 can be printed 420, emailed 422, faxed 424, or otherwise outputted.

The interface in browser 440 shows an organization chart 450 showing staffed 452 and un-staffed 454 positions. The chart 450 can be generated based upon a user selection of the chart type 442 control. A different control 444 is responsible for showing all the positions in the chart 450. A different user selection for the control (shown by control 462) can result in a display (shown in chart 470) of only those positions that are currently filled or staffed. Unfilled positions can be eliminated and the organization chart 470 can be collapsed as appropriate.

Figure 5:
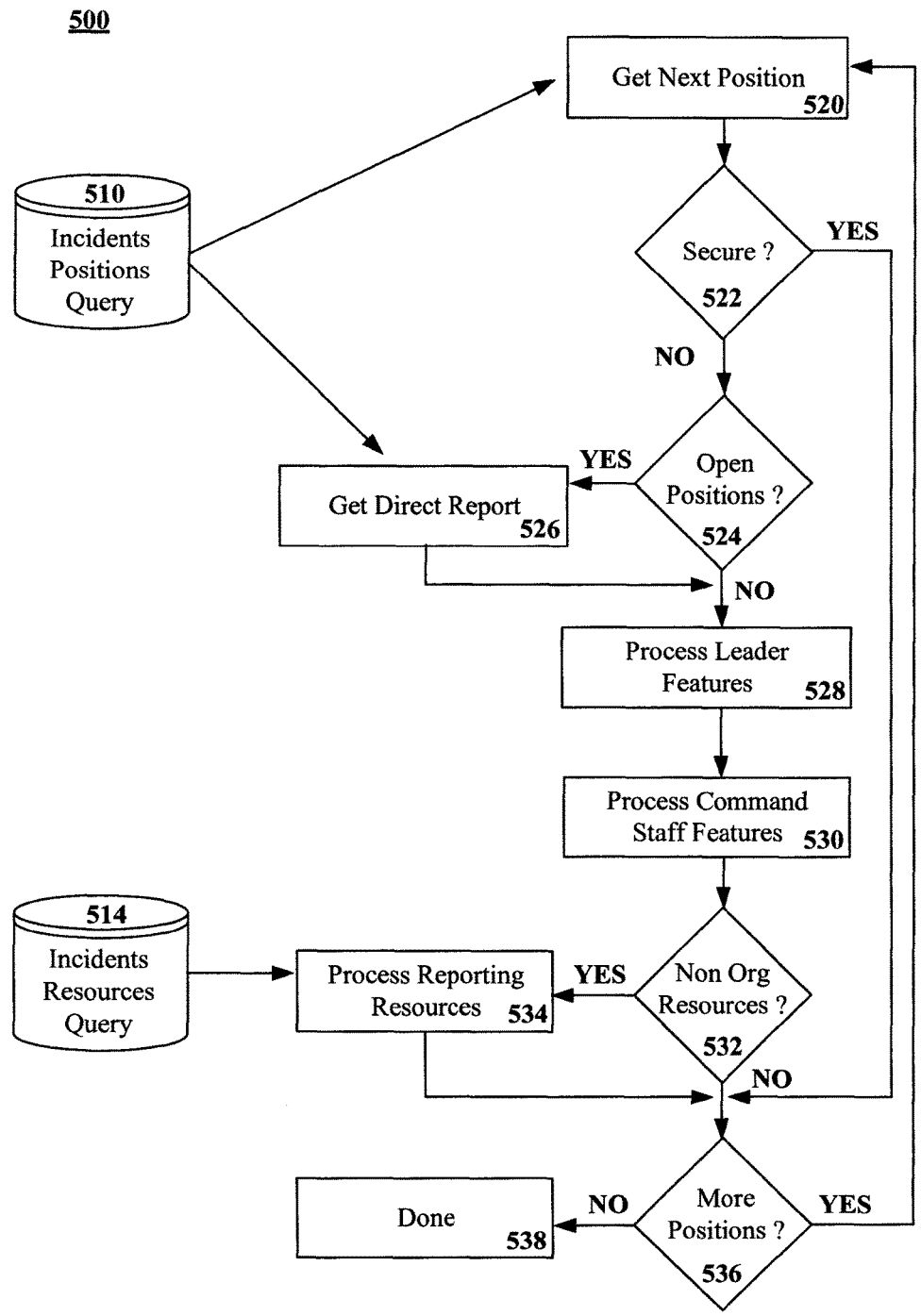
FIG. 5 is a flow chart of a method for an organization chart creation process in accordance with an embodiment of the inventive arrangements disclosed herein.

FIG. 5 is a flow chart of a method 500 for an organization chart creation process in accordance with an embodiment of the inventive arrangements disclosed herein. The method 500 can be used to create the organization charts shown in FIG. 4. The method 500 can be performed in the context of a system 100 or similar system. The method 500 is one of many processes for creating organization charts that illustrate multiple position dependent programmatic actions can be taken, when generating an organization chart.

In method 500, an incidents positions query 510 and an incidents resources query 514 can be performed against a set of database tables. An initial position can be retrieved in step 520. In step 522, a determination can be made as to whether the retrieved position has been secured so that it cannot be included in the organization chart being created by method 500. When the position is secured (e.g., hidden) the method can proceed from step 522 to step 536, where if more positions exist, a next position (step 520) can be retrieved and processed. If the position is not secure, the method can proceed from step 522 to step 524. When a position is open, information appropriate to the position can be retrieved and processed from database records. In step 528, leadership features for the position can be processed based upon query returned information. In step 530, command staff features for the position east be processed.

In step 532, the position can be analyzed to ascertain whether non-organizational resources apply to the position. For example, the position can be a tactical one requiring additional processing. In step 534, reporting resources can be acquired and processed for the position. When no additional positions require processing as determined by step 526, the method can end in step 538. When additional positions require processing, the method can loop to step 520, which causes the method steps to be repeated for the next position.

The present invention may be realized in hardware, software, or a combination of hardware and software. The present invention may be realized in a centralized fashion in one computer system or in a distributed fashion where different elements are spread across several interconnected computer systems. Any kind of computer system or other apparatus adapted for earning out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to earn out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

What is claimed is:

1. A software tool stored in a machine readable medium for managing and depicting organization structures comprising:
    a set of indexed tables specifying positions in an organization structure, personnel assigned to the positions, and reporting authority relationships among the positions, wherein information for the positions, the assigned personnel, and the reporting authority relationships is stored in different ones of the indexed tables;
    a charting tool configured to automatically generate at least one organization chart based upon information stored in the indexed tables, wherein said charting tool is also configured to create different views of the organization structure specified within the set of indexed tables, wherein selective ones of the different views hide at least one position included in the organization structure; and
    a structure charting engine configured to dynamically change the at least one organization chart in response to changes in the set of indexed tables.

2. The software tool of claim 1, wherein the at least one hidden position is an intermediate position in a hierarchy that is the organization structure, wherein the generated organization chart is automatically collapsed so that child nodes of the hidden position are shown as being directly linked to a parent node of the hidden position.

3. The software tool of claim 2, wherein one of the different views having at least one hidden position comprises a filled position view, which hides those positions in the organization structure that have no assigned personnel.

4. The software tool of claim 2, wherein one of the fields linked to a position is a sensitivity field that indicates whether a field should be hidden for security reasons, wherein one of the different views having at least one hidden position comprises an unsecured view which hides those positions in the organization structure having a sensitivity level value that indicates the position is to be hidden.

5. The software tool of claim 2, wherein the generated organization chart is automatically constructed in a proportional manner as a minimal possible graphical representation without any manual reorganizations required by a user of the software tool.

6. The software tool of claim 1, wherein said indexed tables are tables of a relational database conforming to third normal form (3NF) comprising a position table, a resource table, a position reporting table, and an assignment table, wherein each unique position of the organization structure includes one record in the position table, wherein each unique resource of the organization structure includes one record in the resource table, and wherein a person is a resource for purposes of the resource table, wherein each unique reporting relationship among positions of the organization structure includes one record in the position reporting table, and wherein each assignment of a resource to a position includes one record in the assignment table.

7. The software tool of claim 6, wherein the assignments table and the position reporting table each have attributes for a start time and an end time, wherein the assignments table and the position table include records for historic assignments and reporting relationships as well as active assignments and reporting relationships.

8. The software tool of claim 1, further comprising: an command system configured to manage a non-contiguous organization and details of an incident, said incident involving an organization having an organization structure that dynamically changes as situational factors of the incident changes, wherein the charting tool is configured to dynamically generate a current organization chart consistent with a current organization structure as specified by the command system responsive to a user request, wherein at least one of the situational factors triggers a reporting structure change event, said event causing an automatic change in records stored in the indexed table containing records for reporting authority relationships, said automatic change causing said charting tool to alter a hierarchy of positions depicted in an organization chart generated after an occurrence of the reporting structure change event.

9. The software tool of claim 8, wherein the structure charting engine is further configured to generate a set of queries that upon execution interconnect the indexed tables.

10. The software tool of claim 1, said software tool being integrated to a commercial off-the-shelf command management system, which is integrated with the database tables to ensure information consistency between the command management system and a structure and content of the database tables.

11. The software tool of claim 1, said software tool being integrated to a commercial off-the-shelf front-end charting application.

12. A method for charting an organization comprising:
    a computing device identifying a set of database tables for an organization structure, said set of database tables including a position table, a position reporting table, a resource table, and an assignment table, wherein the position table comprises a unique record for each position within an organization structure, wherein the position reporting table comprises a unique record for each relationship among the positions of the table, wherein the resource table comprises a unique record for each resource capable of occupying a position, wherein the assignment table comprises a unique record for each resource/position assignment;
    the computing device receiving a user request for an organization chart;
    the computing device querying the set of database tables to generate an organization object;
    the computing device converting the organization object into a graphical organization chart; and
    the computing device presenting the graphical organization chart to a requestor, wherein the graphical organization chart is dynamically changed in response to changes in any of the set of database tables.

13. The method of claim 12, wherein the user requests a specific view for the organization chart, one possible view being a full view showing filled and unfilled positions, another possible view being a filled view showing only those positions that are filled, wherein structure for the filled view has been collapsed to maintain authority relationships among positions while excluding unfilled intermediary positions in an organization hierarchy, wherein the presented graphical organization chart is consistent with the requested view.

14. The method of claim 12, wherein at least a portion of stored positions applicable to an organization structure corresponding to the organization chart for which the user request applies have a sensitivity attribute which hides the position from unauthorized users, said method further comprising;

the computing device determining a security level of a user making the user request; and the computing device hiding at least one position of the organization structure based upon the sensitivity attribute of the at least one position and based upon the determined security level, wherein the presented organization chart has been collapsed to maintain authority relationships among positions while excluding hidden positions present in an organization hierarchy.

15. The method of claim 12, wherein the set of database tables are in third normal form (3NF), and wherein the set of database tables store historical information regarding positions and assignments, said method further comprising:

the computing device integrating the set of database tables to an incident command system, wherein the incident command system is a commercial off-the shelf system, wherein the integrating step changes enhances the incident command system to add dynamic organization charting capabilities consistent with a non-contagious organization structure that changes based upon situational factors managed by the incident command system;

the incident command system determining an incident event; and responsive to the incident event, automatically altering at least one of the structures of the set of database tables and content stored in records contained in the sets of database tables.

16. The method of claim 12, further comprising:

the computing device receiving an organization chart request from a commercial off-the-shelf application having an organization charting capability, wherein the received user request is the organization chart request;

the computing device formatting the organization object for compatibility with the commercial off-the-shelf application; and the computing device conveying the organization object to the commercial off-the-shelf application which performs the converting and presenting steps.

17. An organizational management computing system comprising:

incident management software stored in a machine readable medium configured to include programmatic instructions directing at least one machine to centrally manage incidents involving at least one organization having an organization structure that dynamically varies as situation factors of a managed incident changes, said incident changes being recorded by the incident management system, which causes the incident management system to effect corresponding changes in the organization structure, wherein the incident management software supports management of adverse event responses; and a charting tool configured to dynamically generate organization charts depicting the organization structure at a user specifiable point in time based upon a set of indexed relational database tables containing records that together define the organization structure, wherein the relational database tables are arranged so that records unique to organizational positions are independent of a reporting relationship among positions, and wherein the relational database tables are arranged so that records unique to the organizational positions are independent of personnel assigned to the positions, wherein said charting tool is also configured to create different views of the organization structure, wherein selective ones of the different views hide at least one position included in the organization structure, wherein at least one hidden position is an intermediate position in a hierarchy that is the organization structure, wherein the generated organization chart that includes the hidden position is automatically collapsed so that child nodes of the hidden position are shown as being directly linked to a parent node of the hidden position.

18. The organizational management computing system of claim 17, said incident management software further comprising an incident command system for determining an incident event, said incident management software comprising code that is operational to, responsive to the incident event, automatically alter at least one of the organizational structures of the relational database tables and content stored in records contained in the relational database tables.

19. The organizational management computing system of claim 17, wherein at least a portion of the positions of the organization structure correspond to the organization chart that has a sensitivity attribute, which hides the at least position from unauthorized users, wherein said organization management system is operable to:

determine a security level of a user making a user request; and hide at least one position of the organization structure based upon the sensitivity attribute of the at least one position and based upon the determined security level.

20. The organizational management computing system of claim 17, wherein said organization management system is operable to:

identify a set of the relational database tables for the organization structure, said set of relational database tables including a position table, a position reporting table, a resource table, and an assignment table, wherein the position table comprises a unique record for each position within the organization structure, wherein the position reporting table comprises a unique record for each relationship among the positions of the table, wherein the resource table comprises a unique record for each resource capable of occupying a position, wherein the assignment table comprises a unique record for each resource/position assignment;

receive a request for an organization chart;

query the set of relational database tables to generate an organization object;

convert the organization object into a graphical organization chart; and present the graphical organization chart to a requestor.

* * * * *